Aug. 9, 1938. S. P. ARVIDIUS Re. 20,819

AUTOMATIC GRAMOPHONE

Original Filed Nov. 1, 1934 4 Sheets-Sheet 1

Inventor:
S. P. Arvidius
By E. F. Wenderoth
Atty

Aug. 9, 1938. S. P. ARVIDIUS Re. 20,819
AUTOMATIC GRAMOPHONE
Original Filed Nov. 1, 1934 4 Sheets-Sheet 2
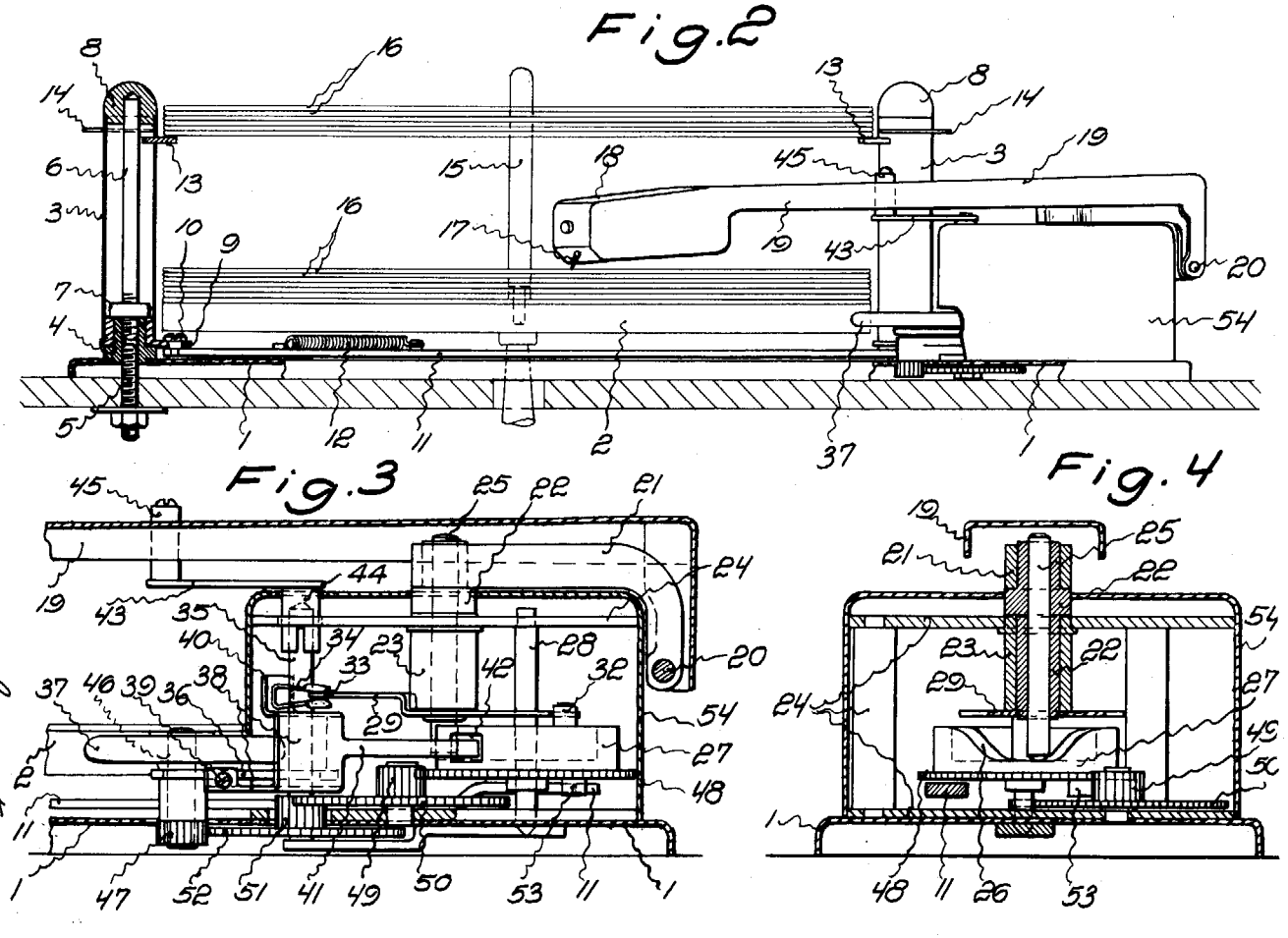
Inventor:
S. P. Arvidius
By E. F. Wenderoth
Atty

AUTOMATIC GRAMOPHONE

Original Filed Nov. 1, 1934 4 Sheets-Sheet 3

Inventor:
S. P. Arvidius
By E. F. Ostenderoth
Atty

AUTOMATIC GRAMOPHONE

Original Filed Nov. 1, 1934 4 Sheets-Sheet 4

Inventor:
S. P. Arvidius
By E. F. Wenderoth
Atty.

Reissued Aug. 9, 1938 Re. 20,819

UNITED STATES PATENT OFFICE 20,819

AUTOMATIC GRAMOPHONE

Svante Philip Arvidius, Motala, Sweden

Original No. 2,031,449, dated February 18, 1936, Serial No. 751,064, November 1, 1934. Application for reissue August 30, 1937, Serial No. 161,634. In Sweden August 28, 1934

10 Claims. (Cl. 274—10)

This invention relates to automatic gramophones of the kind in which a pile of records is supported centrally above a turntable, the records being dropped one at a time upon the turntable and played in succession.

The invention has for its object to provide an improved mechanism for effecting the necessary motions of the movable arm carrying the reproducing needle, and for actuating the means carrying the pile of records so as to cause a fresh record to be dropped upon the turntable after playing of each preceding record.

Further objects of the invention are to provide a mechanism of this character which is reliable in its operation and comparatively simple and inexpensive in its construction and which can be readily applied as an attachment, if desired, to existing gramophones of any conventional type.

With this and other objects in view, the invention consists in certain novel features of construction, combination and arrangement of parts as will fully appear as the description proceeds, the novel features thereof being pointed out in the appended claims.

For a full understanding of the invention, reference is to be had to the accompanying drawings which illustrate a preferred embodiment of the invention and in which:

Fig. 2 is a side view of the same, partly in section;

Fig. 3 is a side view of the mechanism with parts thereof shown in section;

Fig. 4 is a section substantially on the line IV—IV in Fig. 1.

Figure 1:
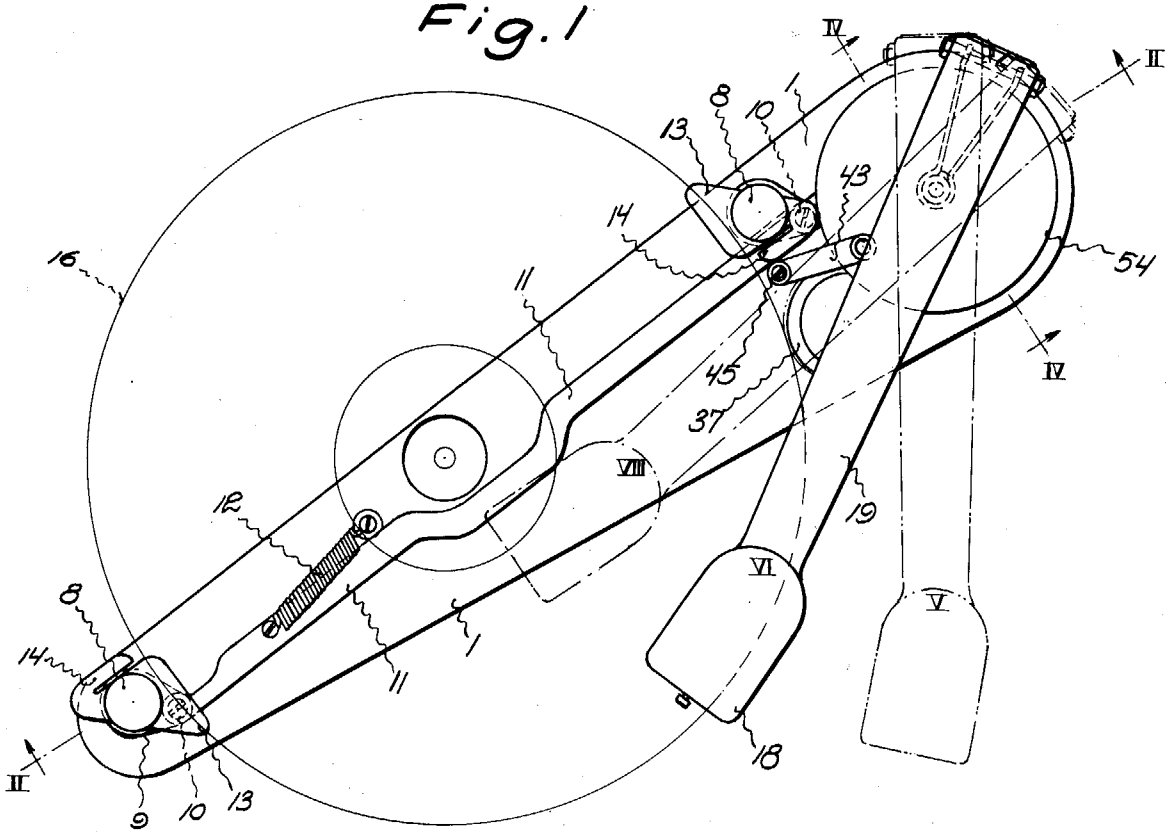
Fig. 1 is a plan view of the attachment.

In the drawings, 1 represents a base plate placed or adapted to be placed underneath the turntable 2 on the gramophone. The ends of the plate 1 extend beyond the turntable 2, and near the edge of the turntable at diametrically opposed points thereof there are mounted on the plate 1 two rotatable uprights 3 preferably in the form of tubes journaled at their lower ends on pivots 4 secured to the plate 1. The pivots 4 have screw threaded bores for screws 5 by which the plate 1 is secured to the gramophone, and for upwardly projecting screw spindles 6 which are provided with collars 7 or the like for holding the tubes 3 on their pivots 4. The tubes 3 at their upper ends are provided with knobs 8 journaled on the upper ends of the spindles 6. Arms 9 secured to the lower ends of the tubular uprights 3 are linked at 10 to a push rod 11 so that the two uprights 3 are rotated to the same extent when the rod 11 is moved in its longitudinal direction. The rod 11 is biased in its normal position, shown in Figs. 1 and 2, by means of a spring 12. Near their upper ends the rotatable uprights 3 are provided with lateral projections 13 and 14 on different levels, the distance between which corresponds to the thickness of a record. The turntable 2 is provided with a central spindle 15 projecting to substantially the same level as the uprights 3.

The records 16 to be played in succession are piled on the spindle 15 and rest on the lower projections 13 on the uprights 3, as is shown in Figs. 1 and 2, until they are dropped upon the turntable in their proper turns. The first record to be played, however, preferably is placed by hand directly on the turntable. By pushing the rod 11 against the action of the spring 12 the uprights 3 are rotated in a direction for displacing the projections 13 and 14 in such a manner that the lowermost record in the pile is released and dropped upon the turntable 2. When the lowermost record in the pile is released, the remaining records in the pile are supported by the upper projections 14, and when the rod 11 and the uprights 3 are returned in their normal positions under the action of the spring 12, the pile of records again is supported by the lower projections 13. Thus, after playing of each preceding record, a fresh record can be dropped upon the turntable, in position to be played by pushing the rod 11 against the action of the springs 12. The rod 11 is adapted to be pushed for this purpose by an automatically acting mechanism by which also the needle carrying arm, after playing of each preceding record, is automatically raised and swung outwardly, clear of the played record, to allow for a fresh record being dropped upon the turntable, and then swung inwardly and lowered until the reproducing needle has engaged the beginning of the sound groove on the fresh record.

In the embodiment of the invention illustrated on the drawings, the invention is applied to an electric gramophone having the reproducing needle 17 secured to a pick-up 18; but it will be understood that the invention, if desired, with but relatively small changes also can be applied to a gramophone having a sound-box carried by a tone-arm.

The pick-up 18 is carried on a vertically and horizontally swinging arm 19 pivoted by means of a pin 20 at the free end of a bent arm 21 (Figs. 3 and 4) secured to the upper end of a vertical sleeve 22 rotatably mounted in a socket 23 secured in a framing 24 on the base plate 1 at one of the ends thereof projecting beyond the turntable 2. A slidable pin 25 fitted in the sleeve 22 rests at its lower end on a cam flange 26 on a cam disk 27 having a vertical shaft 28 journaled in the framing 24. Secured on the lower end of the sleeve 22 is a lever 29 provided at one end with two suitably shaped shanks 30 and 31 extending over the cam disk 27 on opposite sides of the shaft 28 and adapted to be actuated by a roller 32 or the like mounted on the cam disk 27. At the other end the arm 29 is provided with a segment 33 frictionally engaged between the shanks of a bow or clamp 34 rotatably mounted on a vertical shaft 35 journaled in the framing 24. Secured on the shaft 35 is an arm 36 carrying at its free end a friction roller 37 adapted to be brought into engagement with the edge of the turntable 2 so as to be driven thereby. Mounted on the shaft 35 is a plate 38 which is adjustable in relation to the arm 36 by means of an adjusting screw 39. The plate 38 has a portion 40 extending upwardly adjacent the bow or clamp 34 so as to limit rotation of the latter in relation to the plate 38 and the arm 36 about the shaft 35 to but a small value. The plate 38 also has a projecting arm 41 the free end of which abuts the cylindrical circumference of the cam disk 27 or enters a recess 42 therein. An arm 43 is detachably and adjustably secured to the upper end of the shaft 35 by means of a split sleeve 44 and is provided at its free end with a roller 45 or the like in the path of the needle carrying arm 19.

The friction roller 37 is fixed to its shaft 46 which is journaled in the free end of the arm 36. Secured to the lower end of the shaft 46 is a pinion 47, and the cam disk 27 is operatively connected to this pinion 47 through a gearing comprising a wheel 48 secured to the cam disk 27 and engaged with a pinion 49 secured to a wheel 50 engaged with a pinion 51 journaled on the shaft 35 and secured to a wheel 52 engaged with the pinion 47.

Figure 5:
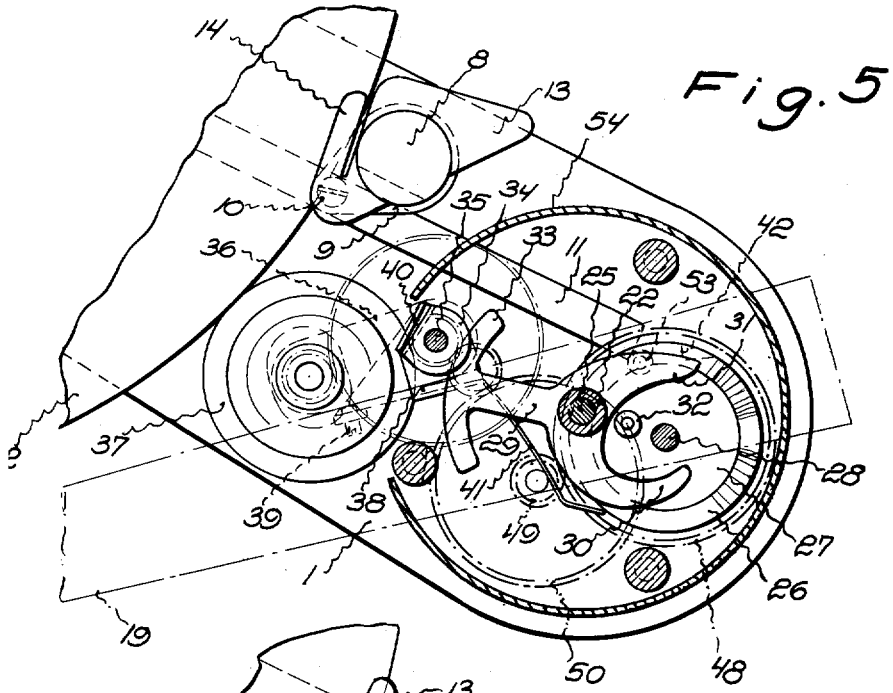
Figs. 5, 6, 7 and 8 are plan views, partly in section, of the mechanism with parts thereof in different position as will be fully understood from the following description.
Figure 6:
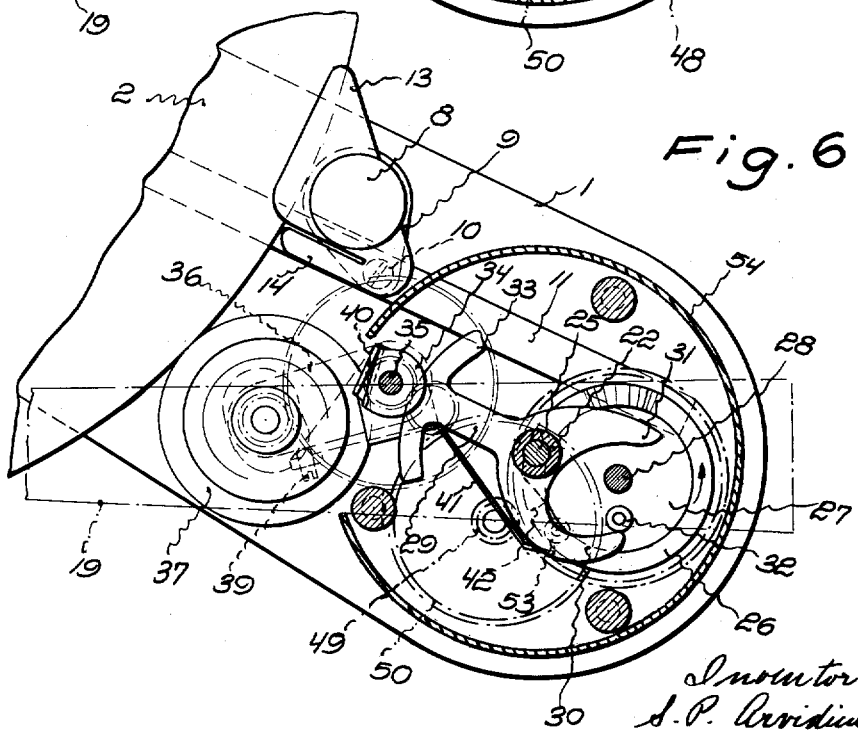
Figure 7:
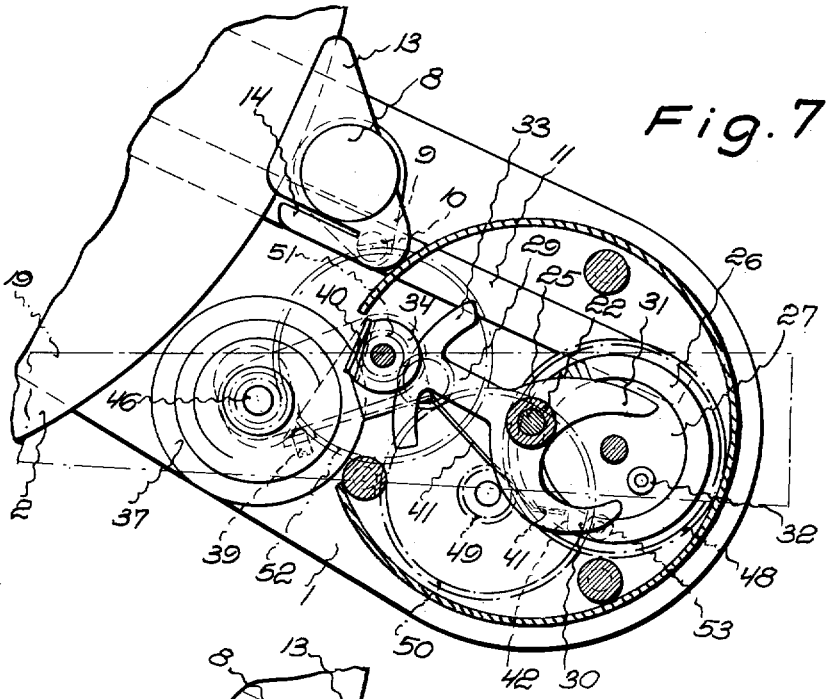
Figure 8:
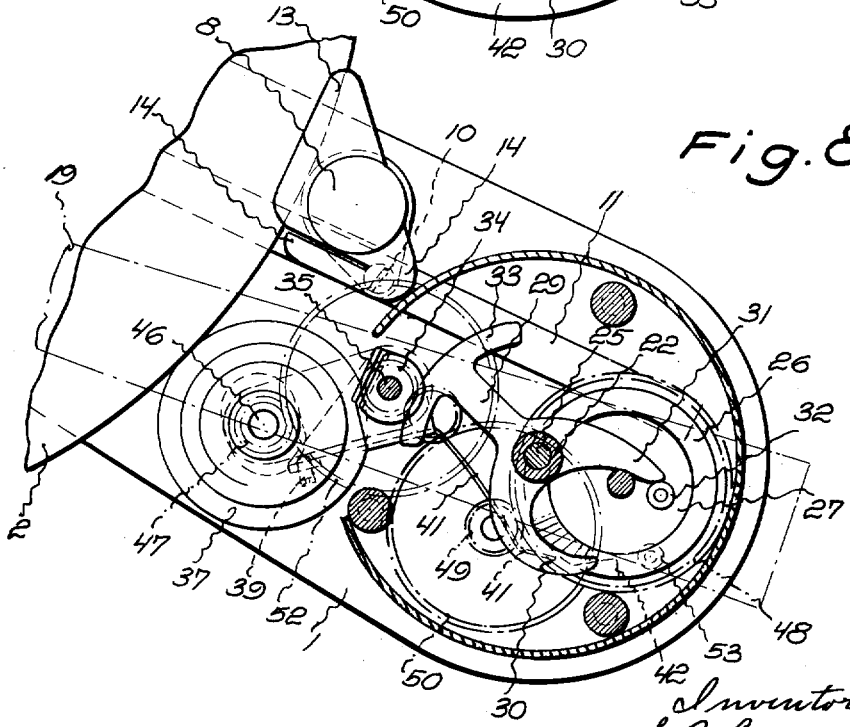

The operation of the mechanism now described is as follows. Figs. 3 and 7 show the mechanism with the parts thereof in positions occupied during playing of a record. The free end of the arm 41 in this position has entered the recess 42 in the cylindrical circumference of the cam disk 27, and the friction roller 37 is out of engagement with the edge of the rotating turntable 2. Supposing that the needle carrying arm 19, when the end of the record is reached, is rapidly moved towards the center of the record by means such as a large-pitch groove ending in a concentric groove on the record, the arm 19 during this rapid motion engages the roller 45 or the like on the arm 43 and moves the latter, whereby the shaft 35 and the arm 36 are rotated to bring the friction roller 37 in frictional engagement with the edge of the rotating turntable 2. The friction roller 37 is now driven by the rotating turntable 2, whereby the cam disk 27 is rotated through the gearing 47, 52, 51, 50, 49, 48. Thus, the recess 42 in the cam disk 27 is moved away from the free end of the arm 41, which thereby will have to rest against the cylindrical circumference of the cam disk 27, whereby the arm 36 will be held with the roller 37 in engagement with the rotating turntable 2, until the cam disk 27 has been rotated through one revolution so that the end of the arm 41 again enters the recess 42. During this rotation of the cam disk 27 through one revolution the pin 25 is first raised by an ascending portion of the cam flange 26 on the disk 27, whereby the pin 25 raises the arm 19 with the reproducing needle 17 from the record. Then, while the pin 25 and the arm 19 are in raised position, the roller 32 or the like on the disk 27 strikes the shank 31 of the lever 29 and rotates this lever 29, the sleeve 22, and the arm 21, whereby the arm 19 is swung outwardly. Fig. 8, corresponding substantially to the position of the arm 19 shown at VIII in Fig. 1, shows the relative positions of the parts of the mechanism in the movement the arm 19 is about to be swung outwardly in this manner. When the arm 19 has been swung outwardly, for instance to the position shown at V in Fig. 1, an abutment 53 on the under side of the disk 27 strikes the adjacent end of the push rod 11, whereby the rod 11 is pushed, as shown in Fig. 5, and a fresh record is released from the pile of records and dropped upon the turntable, as has already been described. During the continued rotation of the disk 27 the abutment 53 leaves the rod 11 which is then returned to normal position through the action of the spring 12, and the roller 32 or the like on the disk 27 strikes the other shank 30 of the lever 29 and rotates the latter and thereby the arm 21 in the opposite direction, whereby the arm 19 is swung inwardly over the fresh record on the turntable to the position shown at VI in Fig. 1 and in Fig. 6. At the same time lowering of the pin 25 and thereby of the needle carrying arm 19 is allowed for by a descending portion of the cam flange 26 of the disk 27, whereby the reproducing needle 17 is engaged with the beginning of the sound groove on the fresh record. Shortly afterwards, the rotation of the cam disk 27 through the one revolution is completed so that the end of the arm 41 enters the recess 42, whereby the friction roller 37 is no longer held in frictional engagement with the edge of the turntable 2 but is ceased to be driven, until the fresh record has been played and the same operation as that now described is repeated. It is to be noted that no spring action is relied upon for releasing the friction roller 37 from the frictional engagement with the turntable, the arrangement shown being such that the frictional driving force between the roller and the turntable tends to move the roller out of its frictional engagement with the turntable.

In the case the sound groove on the record does not end in a concentric groove as supposed above, but in an excentric groove, the arm 19 and thereby also the lever 29 will be put into an oscillatory motion, when the needle 17 has entered this excentric groove on the record. Through the action of this oscillatory motion and the friction between the segment 33 and the bow or clamp 34 the arm 36 is swung with the roller 37 in frictional engagement with the turntable 2, again and again as the case may be, until the cam disk 27 has been rotated sufficiently for bringing the recess 42 to leave the end of the arm 41 so that the latter through coaction with the cylindrical circumference of the disk 27 then holds the arm 36 with the roller 37 in engagement with the turntable in the manner hereinbefore described. It is to be noted that the friction between the segment 33 and the bow or clamp 34 is such that they can slide in relation to each other at the outwardly and inwardly swinging motion of the needle carrying arm 19.

From the foregoing description it will be understood that the mechanism works both for records having a large-pitch groove leading from the sound groove to a concentric groove relatively near the center of the record, and for records in which the sound groove ends in an excentric groove.

The arm 43, being detachably and adjustably secured on the top of the shaft 35 by means of the split sleeve 44, can easily be adjusted so as to suit records having a concentric end groove of a different diameter.

The mechanism, or the essential parts thereof, may be housed within a suitable housing 54.

Though I have illustrated and described a preferred embodiment of my invention in detail for the purpose of ascertaining the nature of the invention as well as for the purpose of enabling other persons skilled in the art to use and vend the same, I am fully aware that many of the details can be varied within wide limits, and also that other modifications are possible, and I reserve the right to make all such obvious modifications which properly fall within the scope of the appended claims.

What I claim and desire to secure by Letters Patent is:

1. In a gramophone, a rotatable turntable, a movable arm adapted to carry a pick-up having a reproducing needle, means for supporting a pile of records centrally above the turntable and operable for dropping said records one at a time upon the turntable, a cam member rotatable about a vertical axis and mounted outside the turntable on the gramophone, a vertical sleeve rotatably mounted above said cam member excentrically thereto, a slidable pin fitted in said sleeve and resting at its lower end on said cam member, a bent arm secured to the upper end of said rotatable sleeve, the needle carrying arm being pivoted to the free end of said bent arm and extending above the said slidable pin, whereby to raise and lower the needle carrying arm through raising and lowering said pin by the same cam member at each revolution thereof, a lever secured to said sleeve and having a bifurcated arm, means on said rotatable cam member for actuating said bifurcated arm, whereby to swing the needle carrying arm outwardly and inwardly at each revolution of said cam member, means on said cam member for operating said operable record supporting means for dropping a record upon the table at each revolution of said cam member and after the needle carrying arm has been swung outwardly, driving means for said rotatable cam member, including a friction roller movable in to and out of frictional contact with the edge of the turntable, means controlled by the movement of the needle carrying arm for moving said friction roller in driving contact with the edge of the turntable, whereby to start rotation of said cam member, and means for positively holding the said friction roller in driving contact with the turntable after starting rotation of said cam member and until return of the latter in its starting position, the said friction roller being so arranged as to be pushed out of driving contact with the edge of the turntable by the driving frictional force therebetween, as soon as positive holding of said roller in such contact with the edge of the turntable ceases.

2. A gramophone as claimed in claim 1, in which the means for moving the friction roller in driving contact with the edge of the turntable includes a rotatably mounted vertical shaft, an arm secured to said shaft and carrying said friction roller, an arm adjustably secured to the upper end of said shaft and extending in the path of the needle carrying arm so as to be operated thereby, a friction means mounted on said shaft and rotatable within relatively close limits relatively to said arm carrying the friction roller, and a segmental arm secured to the rotatable sleeve and frictionally and slidably engaged with said friction means.

3. An attachment for gramophones having a rotatable turntable, in combination, a base plate to be mounted underneath the turntable on the gramophone and to extend at both ends beyond the turntable, rotatable uprights mounted on said base plate near the edge of the turntable at diametrically opposed points thereof, lateral projections at different levels on each of said uprights for supporting a pile of records centrally above the turntable, and displaceable through rotation of said uprights for dropping said records one at a time upon the turntable, arms secured to said rotatable uprights and a spring biased push rod linked to said arms for rotating said rotatable uprights, a framing mounted on one projecting end of said base plate, a cam disk rotatably mounted about a vertical axis in said framing, a sleeve rotatably mounted in said framing above said cam disk excentrically thereto, a slidable pin fitted in said sleeve and resting at its lower end on said cam disk, a bent arm secured to the upper end of said sleeve, an arm pivoted to the free end of said bent arm and carrying a pick-up having a reproducing needle, said needle carrying arm extending above the said slidable pin, whereby to raise and lower the needle carrying arm through raising and lowering said pin by the said cam member at each revolution thereof, a lever secured to said sleeve and having a bifurcated arm, means on said rotatable cam member for actuating said bifurcated arm, whereby to swing the needle carrying arm outwardly and inwardly at each revolution of said cam member, means on said cam member for operating said push rod at each revolution of said cam member and after the needle carrying arm has been swung outwardly, driving means for said rotatable cam member, including a friction roller movable in to and out of frictional contact with the edge of the turntable, means controlled by the movement of the needle carrying arm for moving said friction roller in driving contact with the edge of the turntable, whereby to start rotation of said cam member, and means for positively holding the said friction roller in driving contact with the turntable after starting rotation of said cam member and until return of the latter in its starting position, the said friction roller being so arranged as to be pushed out of driving contact with the edge of the turntable by the driving frictional force therebetween, as soon as positive holding of said roller in such contact with the edge of the turntable ceases.

4. In a gramophone, a rotatable turntable, a movable arm adapted to carry a reproducing needle, means for supporting a pile of records above the turntable and operable for dropping said records one at a time upon the turntable, means including a rotatable cam member and members operable by said cam member at each revolution thereof for moving, after playing of a record on the turntable, the needle carrying arm clear of said record, for operating said operable record supporting means for dropping a fresh record upon the turntable, and for moving the needle carrying arm in engagement with the beginning of the sound groove on the fresh record, driving means for said rotatable cam member, including a friction roller movable in and out of frictional driving contact with the turntable, means controlled by the movement of the needle carrying arm for moving said friction roller in driving frictional contact with the turntable, whereby to start rotation of said cam member, and means for positively holding the said friction roller in driving contact with the turntable after starting rotation of said cam member and until return of the latter in its starting position, said last mentioned means comprising a swingable arm carrying the friction roller, an extension arm adjustably connected to said arm carrying the friction roller, and a cylindrical outer face on the cam member, said face having a recess, and the said extension arm being adapted to coact with said cylindrical face and to enter the recess therein in the starting position of the rotatable cam member.

5. An attachment for gramophones having a rotatable turntable, in combination, an elongated base plate to be mounted underneath the turntable on the gramophone and to extend at both ends beyond the turntable, means mounted on said base plate for supporting a pile of records above the turntable and operable for dropping said records one at a time upon the turntable, a framing mounted on one projecting end of said base plate, a vertical shaft rotatably mounted in said framing, an outwardly extending arm carried by said shaft, an arm adapted to carry a reproducing needle and pivotally connected to said outwardly extending arm, means including a cam member rotatably mounted in said framing and members operable by said cam member at each revolution thereof for moving, after playing of a record on the turntable, the needle carrying arm clear of said record, for operating said operable record supporting means for dropping a fresh record upon the turntable, and for moving the needle carrying arm in engagement with the beginning of the sound groove on the fresh record, driving means for said rotatable cam member, including a swingable arm mounted in said framing and a friction roller carried by said arm and adapted to coact with the turntable, means mounted in the said framing and controlled by the movement of the needle carrying arm for positively moving said last mentioned arm with the friction roller in driving frictional contact with the turntable, whereby to start rotation of said cam member, and means for positively holding the said friction roller in driving contact with the turntable after starting rotation of said cam member and until return of the latter in its starting position.

6. In a gramophone, a rotatable turntable, a player arm, means for supporting a stack of records above the turntable and operable for dropping said records one at a time upon the turntable, means including a rotatable cam member and members operable by said cam member at each revolution thereof for moving the player arm clear of the record after it is played, for actuating said record supporting means to drop another record onto the turntable, and for moving the player arm into initial playing position, driving means for said cam member comprising a wheel having a movable mounting, a rotatable member adapted operatively to engage said wheel, skirt means extending around said cam member for a greater part of its periphery adapted to hold said wheel in engagement with said rotatable member for almost a complete revolution of the cam member, and means controlled by said player arm for moving said wheel into engagement with said rotatable member temporarily so as to initiate a single revolution of the cam member.

7. In a gramophone, a rotatable turntable, a player arm, means for supporting a stack of records, and means for supplying them one by one to said turntable, means including a rotatable cam member and members actuated thereby at each revolution thereof for moving the player arm clear of the record after it is played, for actuating said supplying means, for moving said player arm to initial playing position, driving means for said cam member including a friction wheel, a gearing connecting said friction wheel to the cam member, skirt means extending around the major part of said cam member for holding said friction wheel against said turntable for almost a complete revolution of the cam member, and means controlled by said player arm for moving said friction wheel into engagement with the turntable to initiate a single revolution of the cam member.

8. In a gramophone, a rotatable turntable, a player arm, means for supporting a stack of records to be played, a rotatable cam member beyond the turntable, a vertical sleeve rotatably mounted above said cam member, a slidable pin longitudinally movable in the sleeve with its lower end resting on said cam member, an arm extending rigidly and radially from said sleeve, said player arm being pivotally mounted on said radial arm, said cam member being adapted to raise and lower said pin and said player arm during each revolution, a bifurcated arm on said sleeve and a member on said cam member adapted to engage the two portions of said bifurcated arm to move the player arm outwardly and then inwardly to a lesser extent during each revolution of the cam member, means actuated by said cam member during each revolution for supplying a record from the stack to the turntable, means controlled by the player arm for initiating rotation of the cam member, and skirt means rotatable with the cam member for maintaining said rotation until one revolution of the cam member is completed.

9. In an automatic gramophone, in combination, a cam adapted to control a player arm and records to insure successive playing of a plurality of said records, an arm adapted in one position to insure drive of said cam, and a skirt formation rotatable with said cam for maintaining said arm in said position, said skirt having a recess permitting the arm to move to another position thereby arresting the cam.

10. In an automatic gramophone, in combination, a turntable, a cam adapted to control a player arm and records to insure successive playing of a plurality of said records, a friction wheel adapted to cooperate with a member rotatable with said turntable to be driven thereby, drive means operatively connecting said friction wheel to the cam, a movable arm for moving said wheel into contact with said turntable, a skirt formation rotatable with said cam for maintaining said arm in said position, and a formation on said cam permitting the arm to move to another position whereby the drive of the cam is terminated.

SVANTE PHILIP ARVIDIUS.